(12) United States Patent
Chiron et al.

(10) Patent No.: US 11,846,398 B2
(45) Date of Patent: Dec. 19, 2023

(54) LIGHTING DEVICE FOR A MOTOR VEHICLE HAVING A PLATE THAT CAN BE TRANSLATED HORIZONTALLY AND VERTICALLY RELATIVE TO A SURFACE OF THE PLATE

(71) Applicant: VALEO VISION, Bobigny (FR)

(72) Inventors: Jerome Chiron, Bobigny (FR); Jean-Marc Gressot, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/776,514

(22) PCT Filed: Nov. 12, 2020

(86) PCT No.: PCT/EP2020/081974
§ 371 (c)(1),
(2) Date: May 12, 2022

(87) PCT Pub. No.: WO2021/094494
PCT Pub. Date: May 20, 2021

(65) Prior Publication Data
US 2022/0371508 A1   Nov. 24, 2022

(30) Foreign Application Priority Data
Nov. 13, 2019  (FR) ...................... 1912665

(51) Int. Cl.
*F21S 41/40* (2018.01)
*F21S 41/683* (2018.01)
(Continued)

(52) U.S. Cl.
CPC .............. *F21S 41/40* (2018.01); *B60Q 1/076* (2013.01); *F21S 41/657* (2018.01); *F21S 41/683* (2018.01); *F21W 2102/13* (2018.01)

(58) Field of Classification Search
CPC .......... B60Q 1/06; B60Q 1/064; B60Q 1/068; B60Q 1/0683; B60Q 1/0686; F21S 41/65; F21S 41/657
See application file for complete search history.

(56) References Cited

U.S. PATENT DOCUMENTS

| 2008/0043482 | A1 | 2/2008 | Leitretter et al. |
| 2019/0100129 | A1 | 4/2019 | Kunzl et al. |
| 2019/0359117 | A1* | 11/2019 | Li ........................... F21S 41/39 |

FOREIGN PATENT DOCUMENTS

| EP | 1 820 693 A1 | 8/2007 |
| EP | 2 578 451 A1 | 4/2013 |

(Continued)

OTHER PUBLICATIONS

Machine Translation of EP2796320 (Year: 2014).*
International Search Report dated Dec. 8, 2020 in PCT/EP2020/081974 filed on Nov. 12, 2020 (2 pages).

*Primary Examiner* — Robert J May
(74) *Attorney, Agent, or Firm* — Oblon, McClelland, Maier & Neustadt, L.L.P.

(57) ABSTRACT

A lighting device for a motor vehicle includes a housing having a front lighting surface, a substantially planar plate and at least one lighting module mounted on the plate. The plate has a general plane of extension that is horizontal when the housing is mounted in the vehicle, and has a surface referred to as a lower surface and a surface referred to as an upper surface. The plate includes a first control system which comprises a first male element and is arranged to cause translation of the first male element in an axis parallel to the plate, the plate being provided with a first recess receiving the first male element, and a second control system that includes a second male element and is arranged to cause translation of the second male element in an axis perpendicular to the plate, the plate being provided with a second (Continued)

recess on its upper or lower surface that receives the second male element. The housing thus takes up less space above the modules, which can easily be raised.

20 Claims, 5 Drawing Sheets

(51) Int. Cl.
*B60Q 1/076* (2006.01)
*F21S 41/657* (2018.01)
*F21W 102/13* (2018.01)

(56) References Cited

FOREIGN PATENT DOCUMENTS

| EP | 2 796 320 A1 | 10/2014 |
|----|--------------|---------|
| EP | 3 290 270 A1 | 3/2018 |
| EP | 3 505 396 A1 | 7/2019 |

* cited by examiner

LIGHTING DEVICE FOR A MOTOR VEHICLE HAVING A PLATE THAT CAN BE TRANSLATED HORIZONTALLY AND VERTICALLY RELATIVE TO A SURFACE OF THE PLATE

The invention relates to a lighting device fora motor vehicle, in particular a vehicle headlight or headlamp.

A lighting device for a motor vehicle comprises a plate on which is mounted at least one lighting module, these being arranged together in a housing. The plate extends vertically in the housing when the lighting device is mounted in the vehicle. In order to adjust the angular range of illumination of the lighting module(s), the vertical plate is capable of being pivotable, on the one hand, around a horizontal axis in order to orient the lighting modules angularly downwards or upwards and, on the other hand, around a vertical axis to orient the lighting modules laterally to the right or to the left. The mobility of the plate is obtained by its three-point attachment to the vertical face opposite to that carrying the modules. The first attachment point is integral with the housing and consists of a ball joint to ensure the pivoting of the plate in space, while the two other points, which are spaced apart from the first point so as to substantially form a trihedral, are attached to means of translation, horizontal and vertical, respectively, to make the plate mobile in the horizontal and vertical directions, respectively.

Today, car manufacturers want to make the design of the housings even thinner, while making it possible to adjust the lighting modules with respect to the height of the housings. However, it is not possible with current housings, and even less so with thinner and shorter housings, to increase the vertical travel of a plate. Indeed, the vertical plate has on the one hand an already relatively high upper extent, and on the other hand, it is at the upper end of the plate that the motor is attached, ensuring the vertical mobility of the plate. Consequently, the current shape of the plates and the arrangement of the motorization in the housing are not compatible for moving the plates heightwise in short housings in order to adapt to thinner device designs.

The object of the invention is therefore to propose a new lighting device for a motor vehicle, which obviates the aforementioned drawbacks, by guaranteeing a vertical displacement of the lighting modules over a height range which is equivalent to or greater than that of today, while retaining, or even reducing, the usual bulk of a housing to meet design needs with refined lines.

According to the invention, the lighting device for a motor vehicle comprises a housing (having a lighting front face), a substantially planar plate and at least one lighting module mounted on the plate, the device being characterized in that the plate has a so-called upper face and a so-called lower face, and in that the device comprises, on the one hand, a first adjustment system which comprises a first male element and is arranged to cause a translation of said first male element along an axis parallel to the plate (horizontal direction), the plate being provided with a first recess receiving said first male element and, on the other hand, a second adjustment system which comprises a second male element and is arranged to cause a translation of said second male element along an axis perpendicular to the plate (vertical direction), the plate being provided, at the level of its upper or lower face, with a second recess receiving said second male element.

The housing comprises a front lighting face, a back opposite the lighting face, two opposite lower and upper faces perpendicular to the lighting face and two opposite side faces. Preferably, the plate has a single plane of extent. The plate is mounted in the housing so as to be positioned in a plane substantially parallel to the lower and upper faces of the housing, the lower face of the plate being oriented towards the lower face of the housing, while the upper face of the plate faces the upper face of the housing. The plate has its general plane of extent which is horizontal when the housing is mounted in the vehicle.

The lighting module(s) are preferably mounted on the upper face of the plate.

In the rest of the description, the terms "horizontal", "vertical", "upper", "lower", "top", "bottom", are used in the context of a normal installation of the lighting device, that is to say relating to the ideas of vertical and horizontal with respect to the mounting of the lighting device in a vehicle.

In the rest of the description, the terms X, Y and Z direction mean the directions corresponding to those of a lighting device when mounted in a vehicle, the X direction being the horizontal direction extending depth-wise in the housing between the illuminating front face and the back of the housing, the direction Y being the horizontal direction perpendicular to the X axis (direction extending between the right and the left of the housing, also called the lateral direction), and the Z direction being the vertical direction.

Thus, the plate being arranged in a horizontal plane in the housing (since the vertical extension of the prior art no longer exists) and the design of the plate in combination with the design of the adjustment systems, which provide suitable translations, make it possible to save in terms of volume available for moving the plate height-wise.

According to one feature, the plate comprises two lateral axles (that serve as additional support for the plate with respect to the housing), each lateral axle being received in a slideway provided in the housing. These axles make it possible to react the forces in the Z direction, in the context of the vertical vibrations experienced by the plate. Each of the slideways extends in the X direction; during horizontal adjustment of the plate (adjustment in the X direction), the axles slide in their slideways.

The first and second recesses form capsules in which the male elements of the first and second adjustment systems are received by snap-fitting. A capsule is a recess receiving a male element; it comprises an opening whose profile allows the male element to be snap-fitted into the recess.

Preferably, a male element is spherical.

Several embodiments can be envisaged with regard to the adjustment systems and the attachment of the plate.

In two first embodiments, the embodiments have in common the nature of the first adjustment system, and the attachment of the plate to the housing in a ball joint; they differ in the arrangement of the motorization to bring about the vertical translation of the plate.

In the first two embodiments, the plate is attached to the housing by a ball joint which defines, with the first and second recesses, the axes of rotation of the adjustment of the plate in order to adjust the plate vertically (pivoting from top to bottom and from bottom to top) and laterally (pivoting from left to right or from right to left). In particular, the ball joint is a fixed point of the housing in the form of a projecting element that is integral with the housing and that serves as a ball joint, such as a sphere, and is located eccentrically with respect to (and at the back of) the housing, opposite the first adjustment system. The vertical adjustment of the plate is done by rotation around the horizontal axis defined by two lateral axles integral with the opposite lateral sides of the plate (and oriented in the Y direction), while being coplanar with the ball joint and the first recess of the plate. Lateral adjustment of the plate is done by rotation around the vertical axis defined by the ball joint and the second recess.

Advantageously, in the first two embodiments, the second recess of the plate forms a slideway in which the second element of the second adjustment system is mounted, said second element being in the form of a sphere. Advantageously, the slideway extends tangentially to the arc of a circle, the center of this circle being the ball joint, and its radius being the distance from the ball joint to said second recess.

According to the first embodiment, the second adjustment system comprises a motor (advantageously situated in a plane above the plate, in the upper part of the device and in the back of the housing), a rod and a movement transformation member supporting the second element, the motor being arranged to cause a translation of the rod along an axis parallel to the plate (horizontal axis), and the rod being connected to the transformation member so that the translation of the rod along said axis parallel to the plate causes the translation of said second element along said axis perpendicular to the plate (vertical axis). The transformation member makes it possible to transform an initial movement of horizontal translation into a final movement of vertical translation. Advantageously, the transformation member comprises a bracket comprising two arms, a first arm perpendicular to the plate and connected by one of these ends to the rod, and a second arm connected orthogonally to the first arm and at the end of which is arranged said second element, the bracket being mounted on the housing of the lighting device by a ball joint. In particular, the ball joint of the bracket is arranged at the end of the first arm, opposite that connected to the rod, and in a plane lower than the plane containing the second element.

This arrangement of the motor at the rear of the housing creates a free space above the lighting modules, which can thus be easily raised.

In the second embodiment, the second adjustment system comprises a motor (situated in a plane lower than the plate, in the lower part of the housing), and a rod carrying the second element which preferably is a sphere, the motor being arranged to cause a translation of the rod along said axis perpendicular to the plate (vertical axis). Thus, here again, the technical region with the motor is arranged under the plate which can then be easily raised in the free volume above the lighting modules.

In a third embodiment, the plate comprising two lateral axles each received in a slideway provided in the housing, the first recess defines a ball joint between the first element and the plate, and the second recess defines a ball joint between the second male element and the plate, the first and second recesses defining the axis of rotation for the lateral horizontal adjustment, and the second recess and the lateral axles together defining the axis of rotation for adjustment in a direction perpendicular to the plate (vertical adjustment).

In this third embodiment, the second adjustment system corresponds to that of the first embodiment, comprising a motor, a rod and a movement transformation member (bracket) supporting the second element, the motor being arranged to cause a translation of the rod along an axis parallel to the plate, and the rod being connected to the transformation member so that the translation of the rod along said axis parallel to the plate causes the translation of said second element along said axis perpendicular to the plate. On the other hand, in this third embodiment, the second recess which receives the male element has a shape matching said male element, in the form of a sphere. In this third embodiment, the second recess has no slideway.

Whatever the embodiment, the first adjustment system advantageously comprises an adjustment screw. The first adjustment system acts in a plane parallel to the plate in the X direction to allow a lateral adjustment of the plate. The first recess with which the first adjustment system cooperates (in particular the spherical end of the adjustment screw) forms a slideway whose opening is located in a plane perpendicular to the general plane of extent of the plate (that is to say located vertically). The slideway of said first recess has its longitudinal axis axially aligned with the lateral axles of the plate.

According to a feature of the lighting device of the invention, the plate and the movement transformation member, when present, comprise at least one ribbed face. Advantageously, the plate and the movement transformation member, when present, are based on a thermoplastic polymer, for example polybutylene terephthalate (PBT), optionally reinforced with glass fiber, or aluminum.

According to another feature, the device comprises one or more lighting modules arranged on the plate.

In a preferred use, the lighting device comprises a lighting module of the segmented high-beam type, the module being mounted on the plate and being adjustable in height by means of a vertical adjustment screw inserted into a vertical orifice of the plate.

The present invention is now described with the aid of examples that are only illustrative and in no way limit the scope of the invention, and with reference to the accompanying illustrations, in which.

Figure 1:
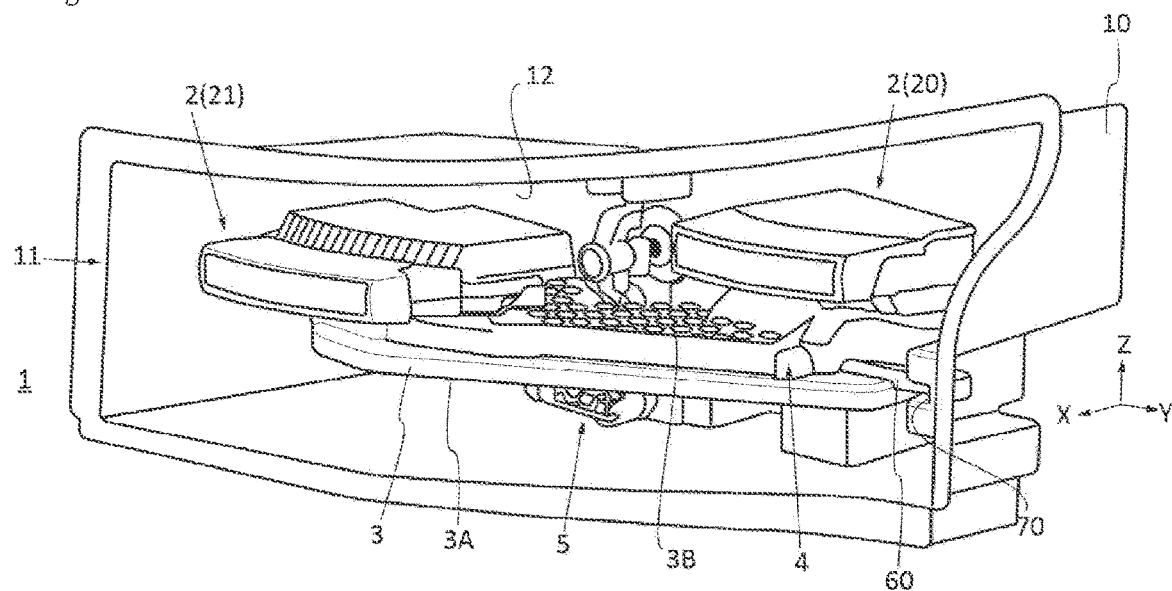
FIG. 1 represents a front perspective view of a lighting device according to the invention with regard to a first embodiment.

The motor-vehicle lighting device 1 illustrated in the figures is in particular intended to constitute a vehicle headlight or headlamp.

The lighting device 1 comprises at least one lighting module 2 for lighting, in this case two lighting modules 20 and 21 being illustrated, a plate 3 designed to be movable and serving to support the lighting modules, a housing 10 accommodating the assembly of the plate and of the lighting modules, and having a front face 11 from which the light of the lighting modules is emitted, as well as means 4, 5 for adjusting the height and the depth of the plate in the housing in order to adjust the angular orientation of the lighting modules vertically in the Z direction (bottom to top or top to bottom) and laterally in the Y direction (left to right or right to left).

The plate 3 is substantially planar; it has a lower face 3A and an upper face 3B. According to the invention, the plate 3 is arranged in the housing 10 so as to extend in a single dimensional extent corresponding to a horizontal plane in the position of use of the device.

In addition, the plate 3 comprises, on each of its lateral sides, an axle 60, 61, respectively, which extends in a direction parallel to the general plane of the plate and in a direction parallel to the back 12 of the housing (perpendicular to the direction connecting the front face 11 to the back 12 of the housing). These axles 60 and 61 are received in respective slideways 70 and 71 provided in the body of the housing 10. The axles 60 and 61 make it possible to react the forces in the Z direction, in the context of the vertical vibrations experienced by the plate.

The adjustment means 4 are capable of moving the plate 3 in a direction parallel to the plate and depth-wise in the housing (horizontal direction X). The adjustment means 5 are capable of moving the plate 3 along a plane perpendicular to the plate (vertical direction Z).

More specifically, the adjustment means comprise a first adjustment system 4 supported by the body of the housing 10 and cooperating with the plate 3 to translate it in parallel, and a second adjustment system 5 supported by the body of the housing 10 and cooperating with the plate 3 in at least one other location thereof to translate it perpendicularly to its plane of extent.

Figure 2:
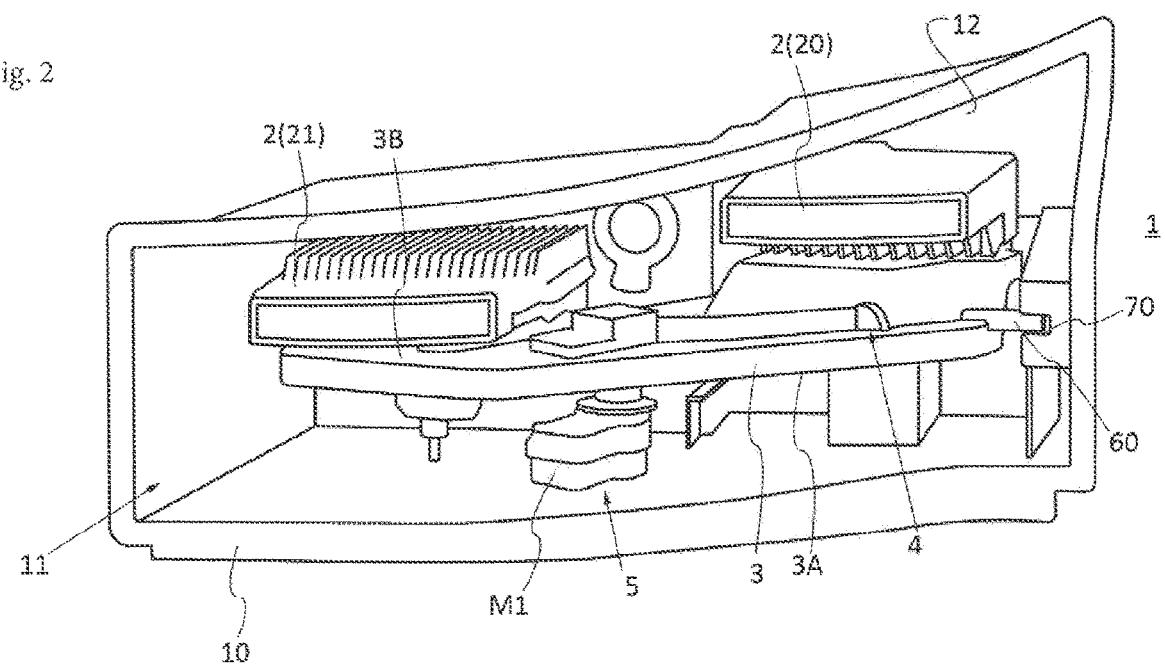
FIG. 2 represents a front perspective view of a lighting device according to the invention with regard to a second embodiment.
Figure 8:
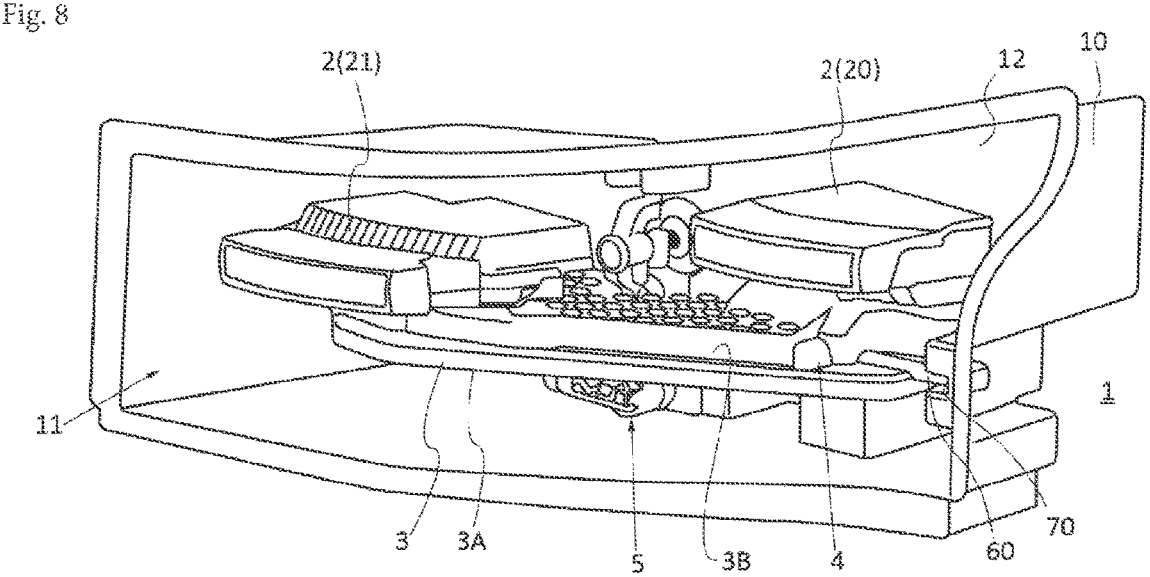
FIG. 8 is a front perspective view of a lighting device of the invention according to a third embodiment.

FIGS. 1, 2 and 8 illustrate two embodiments with regard to the design of the plate 3, and to the design of the adjustment means 4 and 5 and of their connection with the housing 10, respectively.

Figure 3:
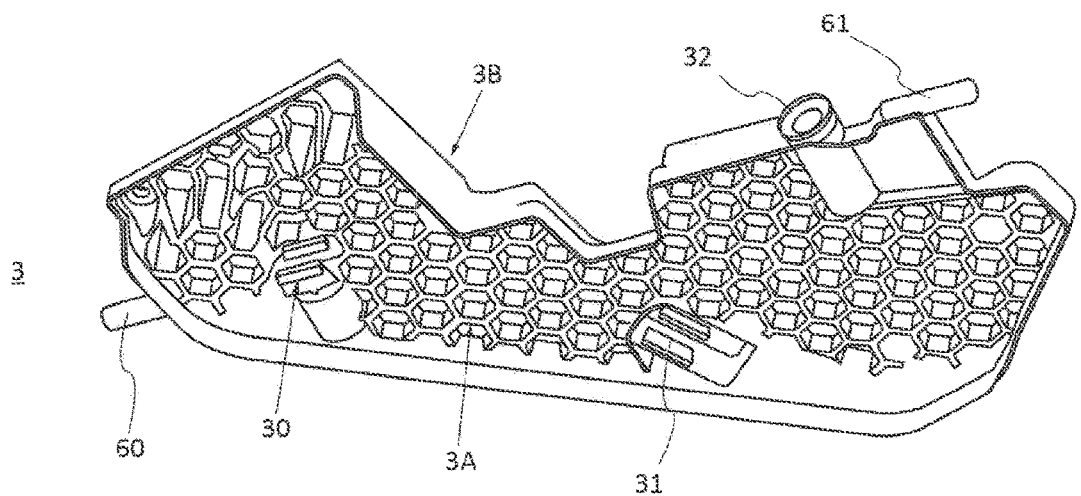
FIG. 3 is a perspective view from above of the lower face of the plate, the plate being common to the first two embodiments of the device of FIGS. 1 and 2.

In the first two embodiments (FIGS. 1 and 2), the plate 3 illustrated in FIG. 3 and the adjustment means 4 (FIGS. 4 and 5) for the horizontal translation of the plate 3 are common. On the other hand, the adjustment means 5 for the vertical translation of the plate 3 differ between these two embodiments.

These first two embodiments are described below.

According to the invention, the plate 3 (FIG. 3) comprises at least two recesses 30 and 31 that are intended to cooperate with male elements 40 and 50 of the respective adjustment systems 4 and 5, and a connection point 32, here a female shape, that is intended to cooperate with a fixed link 13 integral with the back 12 of the housing 10 to form a ball joint between the plate and the housing.

Figure 4:
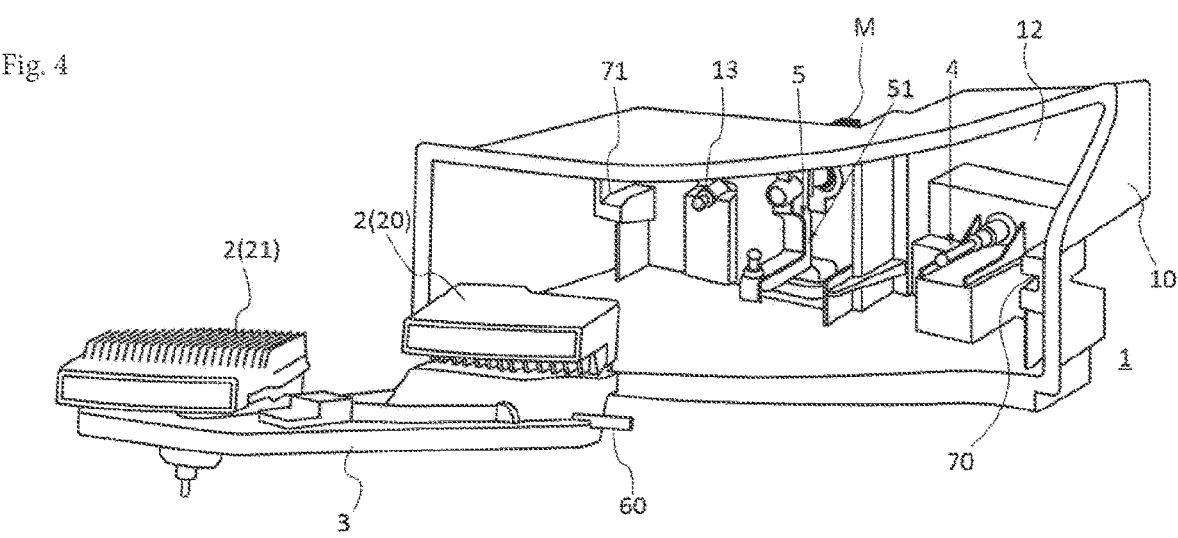
FIG. 4 is a partially exploded perspective view of FIG. 1.
Figure 5:
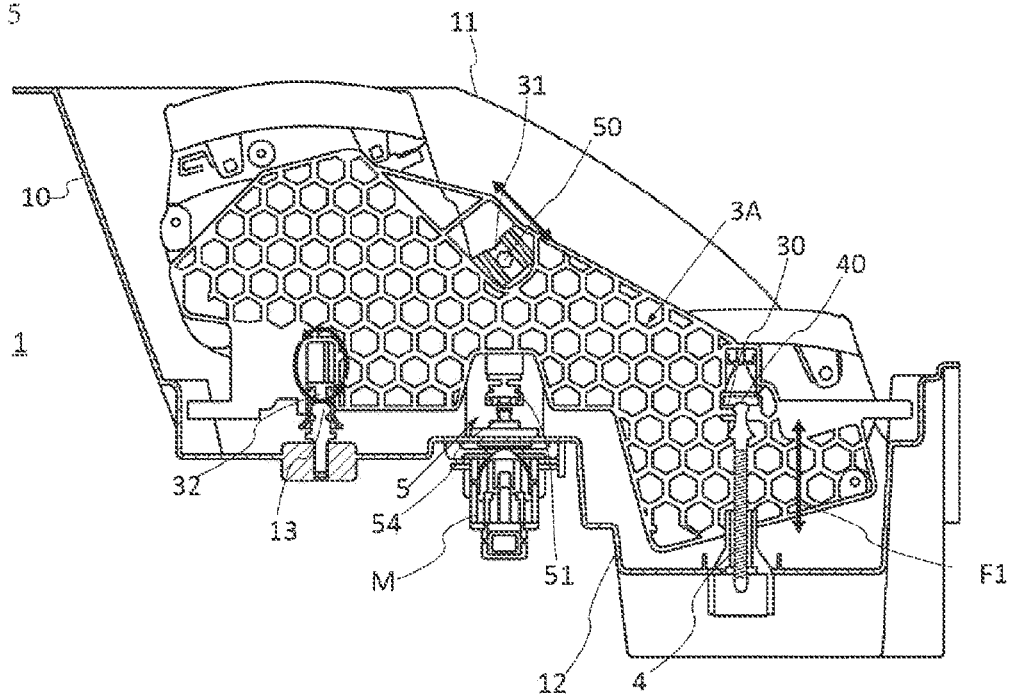
FIG. 5 is a horizontal sectional view from below of the device of FIG. 1.

With reference to FIGS. 4 and 5, the first adjustment system 4 comprises an adjustment screw 40 which is arranged in the back 12 of the housing and whose front distal end corresponds to the male element 40. The screw 4 extends in a plane parallel to the plate 30, along a horizontal plane. Preferably, the male element 40 has a spherical head. The recess 30 of the plate forms a blind orifice whose entry is located in a plane perpendicular to the general plane of the plate. This first recess 30 can be located at the level of the lower face 3A of the plate as illustrated here, or on the edge of the plate in its thickness, or even on its upper face 3B. The screw 4 whose head 40 is engaged in the recess 30 is intended to be screwed or unscrewed to bring about the translation of the plate 3 according to the arrow F1 in a plane parallel to the general plane of the plate (horizontal plane) between the front face 11 of the housing and the back 12. The recess 30 is advantageously in the form of a slideway whose axis coincides with the direction of the axles 60 and 61 of the plate.

According to the first embodiment of the lighting device, the second adjustment system 5, which generates a vertical translational movement of the plate 3 and is illustrated in FIGS. 1, 4 and 5 to 7, comprises a motor M capable of exerting a horizontal pull or push, and angle transmission means to generate a vertical translation on the plate.

In particular, the adjustment system 5 comprises the motor M and a movement transformation member 51 which is arranged as an interface between the motor M and the plate 3 so as to transform a horizontal movement produced by the motor M into a vertical movement of the plate 3, as well as the male element 50 that is integral with the member 51 and is received in the second recess 31 of the plate.

Figure 6:
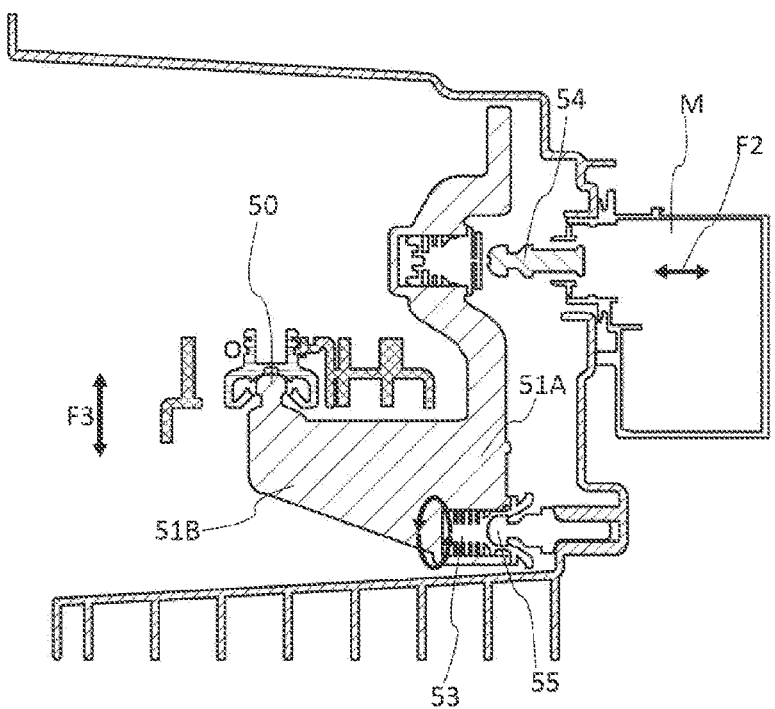
FIG. 6 is a vertical and side sectional view of the device of FIG. 1.
Figure 7:
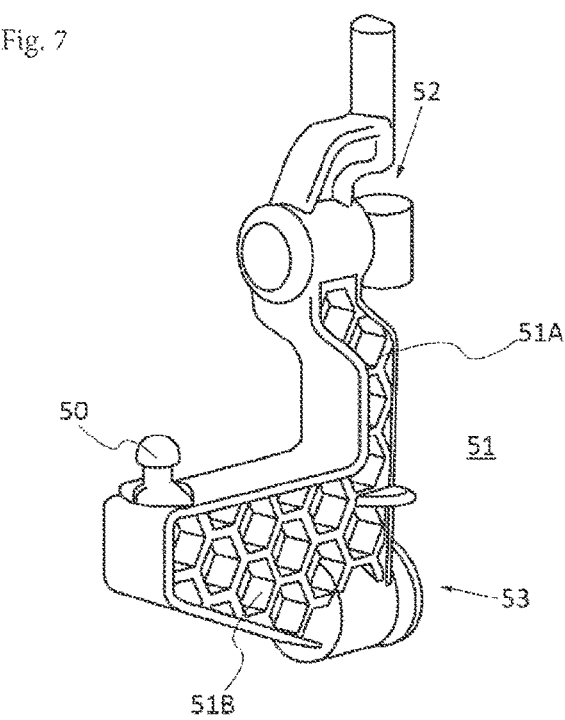
FIG. 7 is a perspective view of the movement transformation member constituting an interface part between the housing and the plate of the first embodiment of FIG. 1.

The movement transformation part 51 is in this case in the form of a bracket (FIGS. 6 and 7). The bracket 51 has two arms, a vertical arm 51A and a perpendicular horizontal arm 51B, and three connection points, a first connection point (top point) 52 which is arranged in the upper part of the vertical arm 51A and forms a cavity, preferably in the form of a vertical slideway, the entrance to which is located in a vertical plane, a second connection point 53 (bottom point) located opposite the first point, at the lower end of the vertical arm 51A, and a third connection point which consists of the male element 50. The three connection points 52, 53 and 50 form a trihedral. The connection points 52 and 53 are coplanar, while the male element 50 is offset. The third connection point/male element 50 is arranged in a plane located above the low point 53. When the bracket 51 is mounted on the housing 10 and the plate 3, the rear of the plate cooperates with the adjustment systems 4 and 5, while the male element 50 is projected towards the front of the plate.

The motor M is arranged in the back of the housing and at the rear of the bracket 51, that is to say opposite the plate 3. The adjustment system 5 comprises a rod 54 which is connected to the motor M and is designed to be driven in translation by the motor, parallel to its longitudinal axis, and parallel to the general plane of the plate.

The first connection point, or the cavity 52 of the bracket 51, is connected to the motor M via the rod 54. Preferably, the free end of the rod 54 is domed. The head of rod 54 is received in the top connection point/cavity 52 of bracket 51; driving the rod 54 exerts on the bracket 51 a horizontal translational movement parallel to the general plane of the plate 3 (arrow F2 in FIG. 6).

The second connection point 53 is integral with the housing at a fixed point 55 with a spherical head to form a ball joint. The second connection point 53 forms a cavity which accommodates the ball shape 55 of the housing. The fixed arrangement of the second ball joint connection point 53, 55, opposite the first connection point 52 which is mobile, causes the bracket 51 to rotate around the ball joint 55.

The third connection point consisting of the male element 50 is arranged at the free end of the horizontal arm 51B of the bracket, and in a plane situated higher than the second connection point/the ball joint connection 53, 55 (and lower than the first connection point 52). The rotation of the second connection point 53 around the ball joint 55 generates the vertical translation of the third connection point/the male element 50 (arrow F3 in FIG. 6). The male element 50 is remote from the ball joint 53, 55 in an appropriate manner to provide a radius of curvature in relation to the desired pivot angle of the lighting modules. Preferably, the male element 50 is in the shape of a sphere. The cooperation of the male element 50 with the second recess 31 of the plate generates the vertical translation of the plate 3. The recess 3 has its opening in a plane parallel to the plate (horizontal plane).

Advantageously, with regard to FIG. 3, the second recess 31 of the plate 3 forms a slideway which extends tangentially to the arc of a circle, the center of this circle being the connection point 32, and its radius being the distance between the connection point 32 and the center of the slideway 31. The slideway 31 has a longitudinal axis that is inclined with respect to the vertical and in the direction of the first adjustment system 4.

According to the second embodiment of the adjustment system 5, illustrated in FIG. 2, said adjustment system 5 generates a direct movement of vertical translation of the plate 3. To that end, the adjustment system 5 comprises a motor M1 capable of exerting a vertical pull or push at the level of the lower face 3A of the plate 3 in order to translate the plate vertically and make it go up or down. In addition, the adjustment system 5 comprises the male element 50 cooperating with the second recess of the plate, the male element 50 in this case being formed by the end—preferably spherical—of a rod connected to the motor M1.

In the first two embodiments described above, the plate 3 is also attached by its third recess 32 to the fixed point 13 of the housing. This fixed connection point 13 is off-center in the back 12 of the housing, and located in the upper part opposite the first adjustment system 4 with respect to the vertical plane containing the motor M or M1. The connection point 13 is in the form of a ball joint (FIG. 4) to ensure rotation of the plate around this point.

Figure 9:
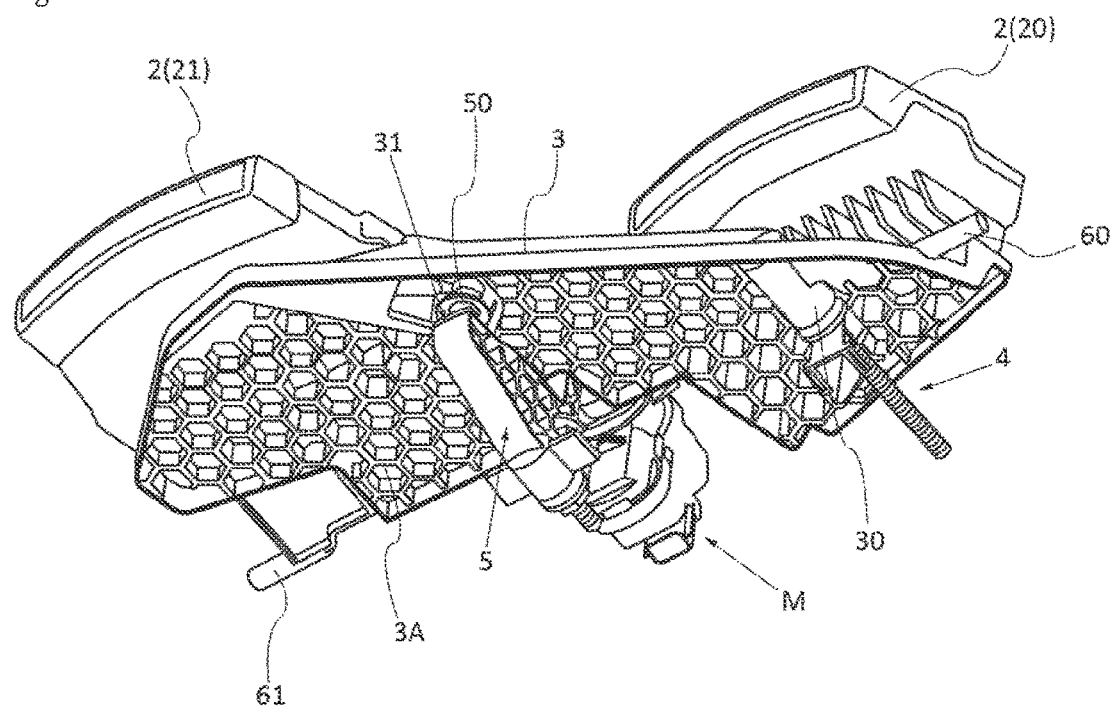
FIG. 9 is a perspective view from below of the plate and the lighting modules of the device of FIG. 8.
Figure 10:
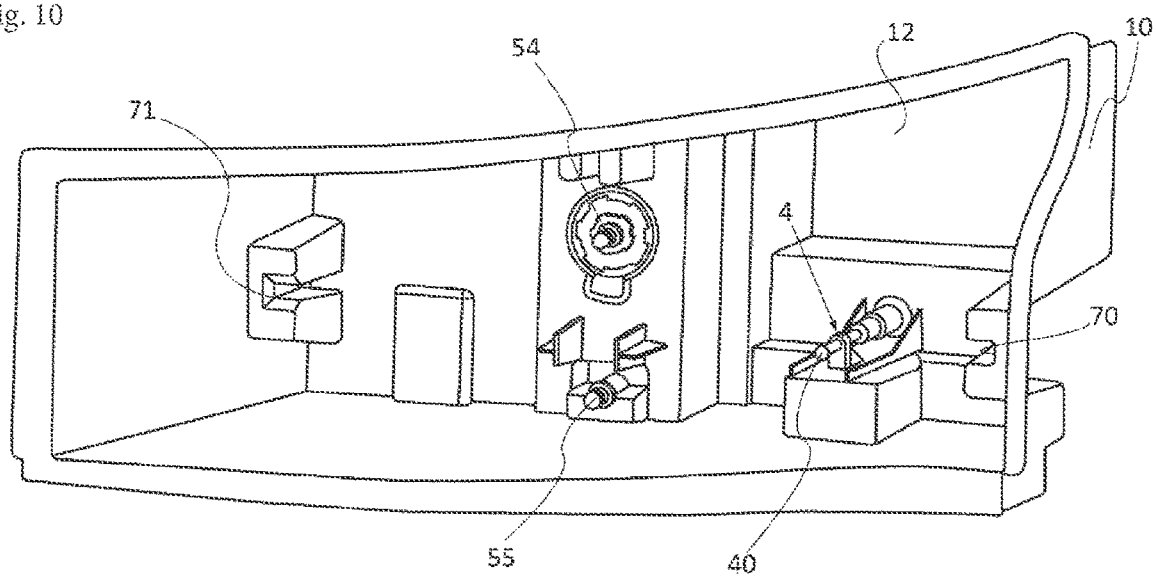
FIG. 10 is a front perspective view of the inside of the housing of the device of FIG. 8, before mounting the plate and the lighting modules.

According to a third embodiment of the lighting device of the invention, illustrated in FIGS. 8 to 10, the device 1 comprises the same adjustment system 4 in horizontal translation as that described above for the two other embodiments (adjustment screw whose end 40 is received in the first recess 30 of the plate). On the other hand, as illustrated in FIG. 10, the device 1 does not include the fixed connection point 13 of the first two embodiments. The plate 3 is carried by the housing via its lateral axles 60, 61 and by the adjustment systems 4 and 5 respectively via its recesses 30 and 31.

Moreover, although the adjustment system 5 which generates a vertical translational movement of the plate 3 is identical to that of the first embodiment via the motor M and the movement transformation member (bracket) 51, the second recess 31 of the plate 3 which accommodates the second male element 50 of the bracket differs in its geometry. The second recess 31 of the plate has a female shape matching the shape of the male element 50. Here, the second recess 31 has a spherical female shape.

The invention claimed is:

1. A lighting device for a motor vehicle, comprising:
a housing having a lighting front face;
a plate that is substantially planar; and
at least one lighting module mounted on the plate,
wherein the plate has a lower face and an upper face, and the housing comprises
a first adjustment system which comprises a first male element and is configured to cause a translation of said first male element along a first axis parallel to the plate, the plate having a first recess configured to receive said first male element, and
a second adjustment system which comprises a second male element and is configured to cause a translation of said second male element along a second axis perpendicular to the plate, the plate having a second recess configured to receive said second male element, the second recess positioned at an upper or lower face of the plate.

2. The lighting device as claimed in claim 1, wherein the plate comprises two lateral axles, each lateral axle being received in a slideway provided in the housing.

3. The lighting device as claimed in claim 2, wherein the first recess forms a slideway whose opening is located in a plane perpendicular to a general plane of the plate.

4. The lighting device as claimed in claim 2, wherein the first recess and the second recess form capsules in which the first male element and the second male element are received by snap-fitting.

5. The lighting device as claimed in claim 2, wherein the second adjustment system comprises a motor situated in a plane lower than the plate, and a rod carrying the second male element, the motor being arranged to cause a translation of the rod along said second axis perpendicular to the plate.

6. The lighting device as claimed in claim 2, wherein the second adjustment system comprises a motor, a rod and a movement transformation member supporting the second male element, the motor being arranged to cause a translation of the rod along the first axis parallel to the plate, and the rod being connected to the movement transformation member so that the translation of the rod along said first axis parallel to the plate causes the translation of said second male element along said second axis perpendicular to the plate.

7. The lighting device as claimed in claim 1, wherein the first recess forms a slideway whose opening is located in a plane perpendicular to a general plane of the plate.

8. The lighting device as claimed in claim 1, wherein the first recess and the second recess form capsules in which the first male element and the second male element are received by snap-fitting.

9. The lighting device as claimed in claim 1, wherein the second adjustment system comprises a motor situated in a plane lower than the plate, and a rod carrying the second male element, the motor being arranged to cause a translation of the rod along said second axis perpendicular to the plate.

10. The lighting device as claimed in claim 5, wherein the second male element is a sphere.

11. The lighting device as claimed in claim 1, wherein the second adjustment system comprises a motor, a rod and a movement transformation member supporting the second male element, the motor being arranged to cause a translation of the rod along the first axis parallel to the plate, and the rod being connected to the movement transformation member so that the translation of the rod along said first axis parallel to the plate causes the translation of said second male element along said second axis perpendicular to the plate.

12. The lighting device as claimed in claim 11, wherein the transformation member comprises a bracket comprising a first arm perpendicular to the plate and connected to the rod at an end of the first arm, and a second arm connected orthogonally to the first arm said second male element arranged at an end of the second arm, the bracket being mounted on the housing of the lighting device by a ball joint.

13. The lighting device as claimed in claim 11, wherein:
the first recess defines a first ball joint between the first male element and the plate,
the second recess defines a second ball joint between the second male element and the plate, and the first recess and the second recess define a third axis of rotation for a lateral adjustment of the plate, while the second recess and lateral axles together define a fourth axis of rotation for adjustment in a direction perpendicular to the plate.

14. The lighting device as claimed in claim 11, wherein the second recess has a female shape matching a shape of the second male element which is in the form of a sphere.

15. The lighting device as claimed in claim 1, wherein the second recess of the plate forms a slideway in which the second male element of the second adjustment system is mounted, said second male element being in the form of a sphere.

16. The lighting device as claimed in claim 1, wherein the plate is attached to the housing by a ball joint which defines, with the first recess and the second recess, axes of rotation for adjusting the plate.

17. The lighting device as claimed in claim 16, wherein the second recess of the plate forms a slideway in which the second male element of the second adjustment system is mounted, the slideway extending tangentially to an arc of a circle, the ball joint arranged at a center of the circle, and a radius of the circle being the distance from the ball joint to said second recess.

18. The lighting device as claimed in claim 1, wherein the first adjustment system comprises an adjustment screw.

19. The lighting device as claimed in claim 1, further comprising a movement transformation member, wherein the plate and the movement transformation member comprise at least one ribbed face.

20. The lighting device as claimed in claim 1, further comprising a lighting module of a segmented high-beam type, the lighting module being mounted on the plate and being adjustable in height by means of a vertical adjustment screw inserted into a vertical orifice of the plate.

* * * * *